Aug. 14, 1962   P. A. SMITH   3,049,240
FILTRATION EQUIPMENT
Filed July 20, 1959
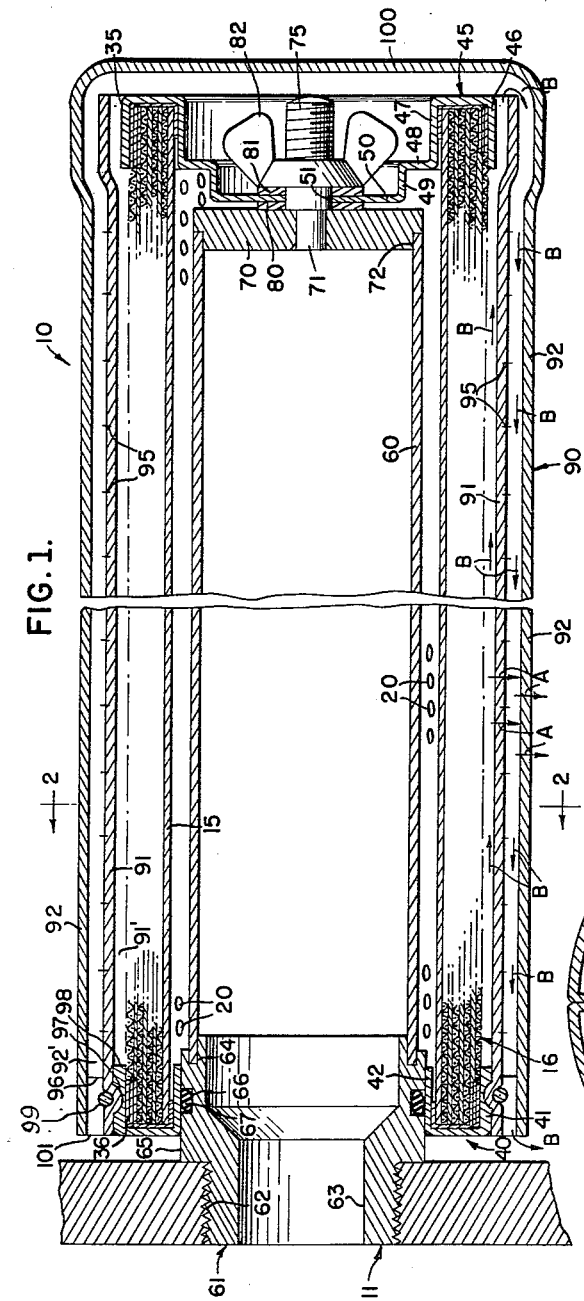
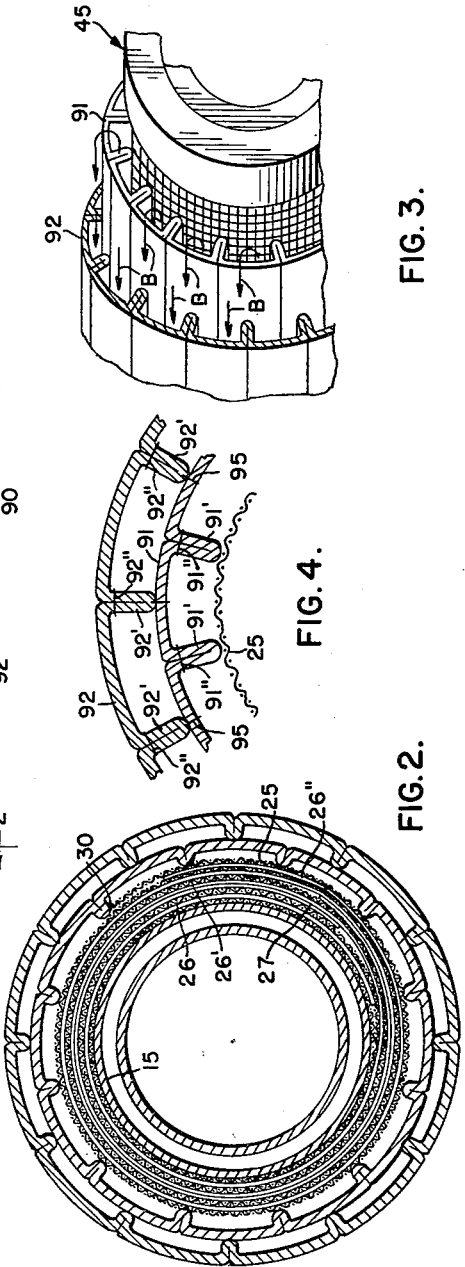
INVENTOR:
Paul A. Smith
BY
Arthur Middleton

3,049,240
FILTRATION EQUIPMENT
Paul A. Smith, Tarzana, Calif., assignor to Permanent Filter Corporation, Los Angeles, Calif., a corporation of California
Filed July 20, 1959, Ser. No. 828,149
9 Claims. (Cl. 210—295)

The present invention relates to new and novel filtration equipment and more particularly to a filter unit which is especially adapted to separate water from filtered fluids.

The unit according to the present invention may be employed for removing undesired contaminants from various fluids, but the invention is particularly adapted for removing contaminants from non-water-soluble hydrocarbon fuels which are employed for example in jet aircraft and missiles. In such applications, the removal of contaminants is a critical factor, and accordingly, the present invention is adapted to provide a high degree of removal of the contaminants of such fluids.

In order to satisfactorily filter hydrocarbon fuels and the like, it is necessary not only to remove the solid contaminants from the fluid, but also to separate out the finely suspended particles of water. The necessity for stripping the water from the fuel is well-recognized since the presence of even relatively small amounts of water in fuel employed in jet aircraft and missiles is very dangerous since it often causes malfunctioning of the engines which results in serious consequences.

The problem of removing suspended water from such fuels has long been recognized in the art, and various combinations of filter media have been proposed, but none of the known arrangements have provided the desired results. The present invention employs a novel arrangement wherein the filtered fluid is first passed through a porous rigid hydrophobic matrix having certain characteristics, and thence through a plurality of layers of fibrous material, this particular combination of filter elements providing new and unobvious results. In addition, a tortuous path means is provided in surrounding relationship to this combination of filter elements to provide an enhanced removal of water droplets.

The drops of water suspended in the fuel are often formed around a dirt particle as a nucleus, while others of the drops are not. These water drops or droplets often have a charge of static electricity, the drops having the same polarity repelling each other thereby resisting coalescing such that the water drops can be readily removed. In passing through the porous matrix of the present invention, it has been found that the static electrical charges on these water particles are removed or neutralized such that the particles or drops become what may be termed docile or charge-free whereby they may be readily coalesced.

The porous matrix also serves to remove solid contaminants of a certain size. The plurality of layers of fiberglass serve the double function of holding back solid contaminants as well as producing a coalescing of the water droplets such that when the filtered fluid passes downstream of the fiberglass layers, water drops of fairly large size have been produced. In order to further enhance the coalescing action, a means is provided in surrounding spaced relationship to the plurality of layers of fiberglass, this surrounding means including a plurality of tubular members which cause the fluid to follow a tortuous path therethrough. As the fluid passes along this tortuous path, the water droplets are caused to be physically contacted with one another which causes the smaller droplets to merge into larger droplets such that they may be more easily removed from the filtered fluid under the action of gravity downstream of the device.

An important feature of the present invention is the manner of assembly of the various filter elements. The porous matrix filter means comprises a first unit which is supported within and is readily mountable and demountable with respect to the coalescer means which forms a second self-contained unit. In this manner, the porous filter means and the coalescer means may be separately manufactured and subsequently assembled in operative position so as to provide a compact assembly which will perform the desired filtering function. In addition, the tortuous path means comprises a separate unit itself which may be removably attached to the outer surface of the coalescer means. This attaching means is in the form of a resilient ring which snaps into place for maintaining the tortuous path unit in proper sealed relationship to the coalescer means.

The coalescer means includes a plurality of layers of fiberglass which are wrapped around a relatively rigid perforated cylindrical member, the layers of fiberglass being secured in assembled relationship by means of a suitable foraminous material. End caps are mounted at opposite ends of the coalescer means and serve as a means for supporting the porous filter means in operative position within the coalescer means. The porous filter means includes a substantially cylindrical porous filter means formed of substantially spherical members bonded to one another. An attaching fitting is secured at one end of the porous cylinder and is slidably received within one of the end caps mounted on the coalescer means. A mounting means is secured to the opposite end portion of the porous cylinder and is removably clamped to the other end cap such that the porous filter means may be easily locked in operative position, and also may be readily removed when it is desired to clean or replace either the coalescer means or the porous filter means.

The tortuous path means comprises a plurality of tubular members which are formed of a hydrophobic material such as nylon which permits relatively ready passage of hydrocarbon fuels therethrough, and yet which resists the passage of water therethrough. Accordingly, a portion of the fluid will pass directly through the material whereas the water droplets will be caused to move along the surfaces of the tubular members thereby contacting one another and merging into larger drops. Each of the tubular members is provided with a plurality of longitudinally extending integral ribs which project radially inwardly thereof. These ribs are formed by doubling the material of the tubular members upon itself to define ribs and sewing them into position so as to form permanent integral ribs. These ribs serve to maintain the tubular members in proper spaced relationship to one another.

The arrangement of the tubular members provides a compact structure wherein a maximum surface area is provided over which the water droplets are forced to travel, thereby insuring a maximum coalescing action. A further advantage of this particular structure is the fact that the outlet of the tortuous path means is disposed at the upstream end of the apparatus. This is highly desirable since it insures the ready separation of the water drops out of the fuel under the influence of gravity before the filtered fluid reaches the outlet portion of the filter tank within which the apparatus of the present invention is utilized.

An object of the present invention is to provide a new and novel filter unit which is particularly adapted not only to remove solid contaminants, but also to serve as an effective coalescing means for promoting water droplet growth.

Another object is the provision of filtration equipment including a coalescing unit plus an additional means for causing the coalesced water droplets to travel in a tortuous path to further contact one another and thereby merge into larger drops, the tortuous path means opening at the upstream end of the apparatus.

A further object is to provide a new and novel filter unit comprising an inner porous filter means surrounded by a coalescer means which is in turn surrounded by a tortuous path means, each of these various means being readily assembled and disassembled with respect to one another.

Still another object of the invention is the provision of a tortuous path means including a plurality of tubular members incorporating a simple and effective structure for spacing the members substantially concentrically about the remaining components of the apparatus.

Yet a further object of the invention is to provide filtration equipment which is quite simple and inexpensive in construction, the arrangement being very compact and yet sturdy and efficient in operation.

Other objects and many attendant advantages of the invention will become more apparent when considered in connection with the specification and accompanying drawing, wherein:

FIG. 1 is a longitudinal section of a filter assembly according to the present invention;

FIG. 2 is a sectional view taken along line 2—2 of FIG. 1 looking in the direction of the arrows;

FIG. 3 is a cut-away perspective view of a portion of the apparatus; and

FIG. 4 is an enlarged view of a portion of the apparatus illustrating the manner of constructing the integral ribs of the tortuous path means.

Referring now to the drawing wherein like reference characters designate corresponding parts throughout the several views, the overall filter assembly is indicated generally by reference numeral 10, this filter assembly being adapted to be mounted as a unit within a suitable supporting structure such as a header or the like mounted in a large filter tank, the assembly according to the present invention serving as one of the filter stages of an overall filter system. It is apparent that the assembly of the present invention is adapted to be screwed into suitable openings in the header by means of a threaded end portion 11, whereby the assembly may be readily mounted and dismounted with respect to its supporting structure. As seen especially in FIGS. 1 and 2, the outer coalescer unit includes an inner substantially cylindrical member 15 surrounded by a plurality of layers of fibrous material indicated generally by reference numeral 16, and a pair of end caps 40 and 45 mounted at the opposite ends of the unit. The construction of the coalescer unit according to the present invention is identical with that disclosed in copending application, Ser. No. 825,514, filed July 7, 1959, inventors Herbert H. Howard, Paul A Smith and Robert A. Lubben, relating to the novel method of manufacturing the coalescer unit.

The inner cylindrical member of the coalescer unit is formed of a relatively rigid material such as brass and is provided with a plurality of equally spaced perforations 20 formed therethrough. As seen especially in FIG. 2 of the drawing, a strip of foraminous material 25 preferably in the form of insect screening and comprising plastic or the like material is wrapped about the cylinder in a spiral manner such that it is interposed between the various layers of fiberglass. The completed structure includes an inner layer 26 of fiberglass. This inner layer is formed of fiberglass wool such as manufactured under the name of "Fiberglas" by the Owens-Corning Glass Company, layer 26 being constructed of unbonded "B" fibers having an average diameter of .00010 to .00015 inch.

Radially outwardly of the first layer 26 is disposed a double layer 26', 27, these layers being in abutting relationship with one another. Layer 26' is formed of "B" fibers and is actually a continuation of layer 26 while layer 27 is formed of fiberglass wool and comprises unbonded "AA" fibers having an average diameter of .00003 to .00004 inch.

Disposed radially outwardly of the double intermediate layer is a single layer of fiberglass 26" formed of "B" fibers, layer 26" being a further extension of layer 26, 26.'

It is accordingly apparent that there is provided a completed structure including an inner layer of "B" fibers which serve a drop-size propagating function, an intermediate double layer including "AA" fibers which serve as a barrier to fine drops, and an outermost layer of "B" fibers which serve a further drop-size propagating function. The overall assembly is retained in operative position by sealing the foraminous material to itself along a longitudinally extending seam indicated at 30, this seam being formed as by passing a heating gun along the seam to heat-seal the foraminous material to the underlying portion thereof.

The opposite end portions of the coalescer means are sealed by a suitable liquid adhesive and an additional sealing means in the form of adhesive plastic tape indicated at 35 and 36 which is wrapped around the layers of fiberglass and extends down the outside thereof as well as the inside thereof.

A first end cap is indicated generally by reference numeral 40 and is provided with a substantially U-shaped cross-section as seen in FIG. 2, the opposite legs 41 and 42 of the cap being concentric with one another and extending around the outer surface of the coalescer means and around the inner face of the coalescer means respectively. End cap 40 is bonded and secured in operative position relative to the end portion of the coalescer means by heat-curing of plastic ribbon 36 which serves to maintain the end cap in operative position.

Disposed at the opposite end of the coalescer means is a second end cap 45, this end cap including legs 46 and 47 which are concentric with one another and which extend along the outer surface of the coalescer means and the inner surface thereof respectively. Leg 47 is connected integrally with an annular portion 48 from which extends a leg 49 extending normally to flange 48. Leg 49 in turn is formed integrally with a flat wall portion 50 having a central opening 51 formed therethrough. End cap 45 is secured to the end of the coalescer means by bonding the adhesive ribbon 35 thereto by heat-curing or the like. Each of the end caps 40 and 45 is preferably formed of a relatively rigid material such as brass or the like. The above-described structure comprises the coalescer unit of the present invention, the hereinafter described porous filter unit being supported within the coalescer unit by mounting the porous filter unit within the end caps of the coalescer unit.

The porous filter unit includes a substantially cylindrical porous filter member 60 which is formed of a plurality of substantially spherical metallic members which are bonded to one another. A preferred form of matrix is one wherein the spheres thereof are formed of bronze and are sintered to one another. These spheres may, for example, be formed of about 90 percent copper with a 10 percent coating of tin thereon, the spheres being sintered to one another in a well-known manner. The completed relatively rigid cylinder has a staple which is axial while its flow-through is approximately 90 degrees. The matrix may be approximately ⅛ inch to 3/16 inch thick, and the average void space is about 40 percent of the area. The pores or passages through the matrix preferably lie in the range of about 10 to 40 microns. Where the matrix is to be used for holding back about 98 percent of all particles 10 microns in size and larger, the sintered spheres may be sized as follows: 2 percent maximum having a diameter of plus 60 screen mesh; 55–85 percent plus 80 screen mesh; 10–35 percent plus 100 screen mesh; and 10 percent maximum plus 150 screen mesh with the starting spheres being about 90 percent copper with a tin coating of about 10 percent. The "plus" in the foregoing designates particles that will remain on the given sieve size.

An attaching fitting indicated generally by reference numeral 61 is mounted at one end of the porous cylinder 60. Fitting 61 is formed of a suitable, relatively rigid material such as brass and is provided with an outer thread 62 thereon which as described previously serves to enable the assembly to be readily mounted within a header plate. A central bore 63 is formed through the fitting whereby fluid may readily pass through the central portion thereof, and a groove 64 is formed in the inner end thereof within which one end portion of the porous cylinder 60 is seated. Cylinder 60 is suitably secured within the groove 64 as by silver brazing or the like.

An outer cylindrical surface 65 is provided on the attaching fitting which fits snugly within the central opening defined by leg 42 and end cap 40 whereby the porous filter unit may be slid into operative position as shown in FIG. 2. A peripheral groove 66 is provided in surface 65 and a conventional O-ring seal 67 formed of rubber or the like is seated within groove 66. It is apparent that when the attaching fitting is disposed in operative position as shown, the O-ring 67 serves to provide a fluid-tight seal between the attaching fitting and end cap 40.

A mounting means is secured to the opposite end of porous cylinder 60, the mounting means including a plate 70 having a stud 71 secured thereto. Plate 70 is provided with a peripheral groove 72 which receives the adjacent end portion of porous cylinder 60, cylinder 60 being secured to plate 70 as by silver brazing or the like. Stud 71 includes an enlarged portion 75, the outer end of which is threaded, the inner end of the enlarged portion 75 being smooth and fitting snugly within the opening 51 in wall 50 of end cap 45.

A gasket 80 is mounted between the outer surface of plate 70 and the adjacent surface of wall 50 of the end cap to provide a fluid seal therebetween, gasket 80 being formed of rubber or similar material.

A conventional disc-shaped washer 81 is disposed about the smooth inner end of enlarged portion 75 of the stud 71 and is interposed between wall 50 and the inner surface of a wing nut 82, wing nut 82 being threaded on the outer threaded end of stud 71.

It is apparent that when the porous filter unit is disposed in operative position as shown in FIG. 2, the smooth portion of the enlarged outer end of stud 71 and the cylindrical surface 65 of attaching fitting 61 are snugly received within the end caps 45 and 40 respectively. Washer 80 and O-ring 67 serve to provide fluid-tight seals with the respective end caps, and wing-nut 82 secures the porous filter unit in operative position.

It is evident that when it is desired to disassemble the coalescer unit and the porous filter unit, the wing nut is unthreaded from stud 71, whereupon the filter unit is adapted to slide out of the coalescer unit. This permits either the coalescer unit or the porous filter unit to be cleaned or replaced as desired. It is also apparent that the porous filter unit can be readily inserted within the coalescer unit by sliding the porous filter unit into operative position as shown and then threading the wing nut 82 into clamping position.

The tortuous path means indicated generally by reference numeral 90 includes an inner tubular member 91 and an outer tubular member 92, each of these tubular members being formed of a porous hydrophobic material such as nylon, this material providing relatively free passage to hydrocarbon fuels and the like therethrough, but preventing the water from passing therethrough. Referring now to FIG. 4 of the drawing, tubular member 91 is provided with a plurality of integral longitudinally extending ribs 91' and the outer tubular member 92 is provided with a plurality of similar integral longitudinally extending rib portions 92'. Rib portions 91' of the inner tubular member 91 are formed by doubling the material upon itself at equally spaced intervals to provide the double thickness rib portions 91', the material being sewn longitudinally thereof along lines indicated at 91" to maintain the two thicknesses of the rib portions in adjacent relationship whereby permanent integral rib portions are formed.

In a similar manner, the material of outer tubular member 92 is doubled upon itself at regularly spaced intervals to form the rib portions 92', the double thicknesses of each rib portion 92' being sewn together longitudinally along lines 92" to form permanent longitudinally extending ribs.

The radially inner ends of rib portions 92' are secured to the inner tubular member 91 by sewing longitudinally of the ribs along line 95 whereby the two tubular members are permanently secured to one another.

The two tubular members 91 and 92 are provided with longitudinally extending integral ribs about the entire inner surfaces thereof whereby it is apparent that this arrangement will maintain tubular member 91 spaced from the outer surface of the coalescer unit and will additionally maintain tubular member 92 spaced outwardly of tubular member 91 such that these tubular members are held in the proper operative relationship by ribs 91' and 92' to define a tortuous path between the two tubular members.

As seen in FIG. 1, the ribs 92' formed on the outer tubular member 92 terminate at a point 96 short of the end of the tubular member. The outer surface of end cap 40 is provided with a peripheral groove 97 extending completely therearound. A resilient split clamping ring 99 is slipped within the space defined between tubular members 91 and 92 and the ends of ribs 92' such that the split ring is in overlying relation to the peripheral groove 97. The split ring is then allowed to contract into the operative position shown in FIG. 1, whereby the material at the end of the tubular member 91 is forced into the groove 97 such that the entire tortuous path means is removably attached to the coalescer unit. The longitudinally extending grooves 91 terminate short of the end of tubular member 91 and abut up against the end surface 98 of the end cap 40.

As seen in FIG. 1, the upstream end of tubular member 91 is closed and sealed with respect to the coalescer unit whereas the downstream end portion of member 91 is open. The tubular member 92 is provided with the reverse arrangement whereby the end wall 100 provides a closure for the downstream end of the tubular member whereas the upstream end of tubular member 92 is open defining an annular discharge opening 101.

As the filtered fluid passes outwardly of the outermost layer of fiberglass in the coalescer unit, the hydrocarbon fuel or the like may pass radially outwardly through the tubular members 91 and 92 as indicated by arrows "A." The water droplets which have been formed as a result of the passage of the fluid through the coalescer unit will not pass through the tubular members 91 and 92 and accordingly will seek their way out of the apparatus along the inner walls of members 91 and 92. The water droplets are carried along by that portion of the fuel which does not pass through the material of the tubular members and which flows out of the open end thereof. The hydrophobic material of the tubular members is chosen to provide a predetermined residual fuel flow through the open end of the tubular members to produce the necessary flow rate for proper water conglomeration. This will produce a flow of water droplets and particles along the inner surfaces of the tubular members as indicated by arrows "B." This flow as indicated by arrows "B" forms a relatively low velocity stream rich in water droplet content. As the water drops pass along the inner walls of tubular members 91 and 92, they are contacting one another thereby causing a physical merging or coalescing of the droplets to form larger water drops.

As the low velocity stream of fluid emerges through the outlet 101 of the tortuous path means, a stream of water drops is obtained which will readily settle out of the surrounding fuel under the influence of gravity. It is also apparent that the water issues from the apparatus at the upstream end thereof which as pointed out previously, is advantageous since it is further assurance that the water drops will settle out of the filtered fluid before the fluid reaches the exit portion of the overall filter apparatus. In this manner, even the finest droplets of water are caused to coalesce with one another and form relatively large drops due to the physical contact of the water droplets as they pass along the inner surfaces of the tubular members of the tortuous path means.

A further advantage of the structure wherein the tortuous path means is disposed in surrounding relationship to the coalescing unit is the fact that the tubular members 91 and 92 will catch and hold any loose bits or particles of fiberglass which may break off from the fiberglass layers of the coalescer unit during operation.

The action of the fluid flow between the coalescer unit and the two surrounding tubular members 91 and 92 is even more vividly illustrated in FIG. 3 of the drawing which illustrates a perspective cutaway view. In this view, it is evident that the water droplets are caused to flow longitudinally along the outer surface of the coalescer unit, thence around the downstream open end portion of the inner tubular member 91, and then subsequently in the reverse direction longitudinally along the inner surface of outer tubular member 92 as indicated by the arrows "B" until the stream issues from the upstream outlet portion 101 of the apparatus.

The integral longitudinal ribs of the two tubular members provide a very effective and compact arrangement whereby the two tubular members are maintained in proper spaced relationship during operation, and furthermore, the tortuous path means comprises an integral unit which may be readily attached to or removed from the coalescer means if it desired to replace or clean the tortuous path means.

It is apparent from the foregoing that there is provided new and novel filtration equipment which is adapted not only to effectively remove solid contaminants, but also to serve as an effective water stripping device. The assembly according to the present invention includes a porous filter unit surrounded by a concentrically spaced tortuous path unit. Each of these units may be readily assembled and disassembled with respect to one another. A means is provided for mounting a plurality of spaced tubular members about the coalescer unit in a very simple and effective manner, and an outlet is provided for the water drops which is upstream of the apparatus. The filtration equipment of the present invention is quite simple and inexpensive in construction and provides a compact unit which is sturdy and efficient in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Filtration equipment comprising a hollow coalescer means, a hollow porous hydrophobic matrix disposed within said coalescer means and spaced therefrom, means supported in spaced surrounding relationship to said coalescer means and defining a tortuous path between various portions thereof, said tortuous path means being formed of porous hydrophobic material and including a plurality of spaced tubular portions, an inner one of said tubular portions being closed at the upstream end thereof and an outer one of said tubular portions being closed at the end thereof adjacent the downstream end of said inner tubular portion.

2. Apparatus as defined in claim 1, wherein each of said tubular portions including a plurality of longitudinally extending rib portions maintaining the tubular portions in spaced operative relationship.

3. Filtration equipment comprising hollow coalescer means, a hollow porous hydrophobic matrix disposed within said coalescer means and spaced therefrom, means disposed in surrounding spaced relationship adjacent said coalescer means and including a plurality of spaced tubular members defining a tortuous path with said coalescer means, each of said tubular members being formed of porous hydrophobic material which resists the passage of water therethrough, an inner one of said tubular members being closed at the upstream end thereof and open at the downstream end thereof, an outer one of said tubular members being closed at the end thereof adjacent the open end of said inner tubular member and open at the opposite end thereof, each of said tubular members having formed integral therewith a plurality of longitudinally extending rib portions projecting inwardly thereof and maintaining the tubular members in spaced operative relationship.

4. Apparatus as defined in claim 3, wherein said tubular members are formed of fabric, the rib portions of each of the tubular members comprising portions of the fabric doubled upon itself, said doubled portions being sewn together to define permanent rib portions.

5. Filtration equipment comprising coalescer means including a plurality of layers of fibrous material disposed substantially concentrically to one another, a hollow porous hydrophobic matrix disposed within said coalescer means and spaced therefrom, tortuous path means disposed in surrounding spaced relationship to said coalescer means and adjacent thereto, said tortuous path means including a first tubular portion and a second tubular portion disposed in surrounding relationship to the first tubular portion, each of said tubular portions being formed of porous hydrophobic material which resists the passage of water therethrough, said first tubular portion being secured to the coalescer means and sealed with respect thereto at the upstream end of the tubular portion, the downstream end of said first tubular portion being open, the adjacent end of said second tubular portion being closed, and the opposite end of said second tubular portion being open, each of said tubular portions including a plurality of integral rib portions projecting inwardly therefrom, the inner portions of the rib portions on the outer tubular portion being secured to the inner tubular portion.

6. Apparatus as defined in claim 5, including means removably securing said inner tubular portion to the upstream end of said coalescer means, said removable means including a peripheral groove formed in the coalescer means, and a resilient ring urging said inner tubular member into said peripheral groove.

7. Filtration equipment comprising coalescer means including a relatively rigid perforated inner cylindrical member, a plurality of layers of fiberglass disposed in surrounding relationship to said cylindrical member, means maintaining said layers of fiberglass in operative position, a hollow porous hydrophobic matrix disposed within said coalescer means and spaced therefrom, tortuous path means disposed in surrounding spaced relationship to said coalescer means adjacent the outer periphery thereof, said tortuous path means including a pair of spaced tubular members formed of porous hydrophobic material, the inner tubular member being closed at the upstream end thereof and open at the downstream end thereof, the outer tubular member being closed at the end thereof adjacent the open end of said inner tubular member and open at the opposite end thereof, each of said tubular members including a plurality of spaced longitudinally extending integral rib portions for maintaining the tubular members in spaced operative relationship, and means removably securing the inner tubular member to the upstream end of the coalescer means.

8. Apparatus as defined in claim 7, including a porous filter means mounted within and spaced from said coalescer means, said porous filter means comprising a plurality of substantially spherical metallic members bonded to one another.

9. Apparatus as defined in claim 8, wherein said porous filter means is open at the upstream end thereof and closed at the downstream end thereof.

References Cited in the file of this patent

UNITED STATES PATENTS

| | | |
|---|---|---|
| 985,961 | Ten Winkel | Mar. 7, 1911 |
| 1,654,615 | Smith | Jan. 3, 1928 |
| 2,598,818 | Muirhead | June 3, 1952 |
| 2,657,808 | Mankin | Nov. 3, 1953 |
| 2,725,986 | Marvel | Dec. 6, 1955 |
| 2,800,232 | Marvel | July 23, 1957 |
| 2,877,903 | Veres | Mar. 17, 1959 |
| 2,911,101 | Robinson | Nov. 3, 1959 |
| 2,953,249 | Topol et al. | Sept. 20, 1960 |